UNITED STATES PATENT OFFICE.

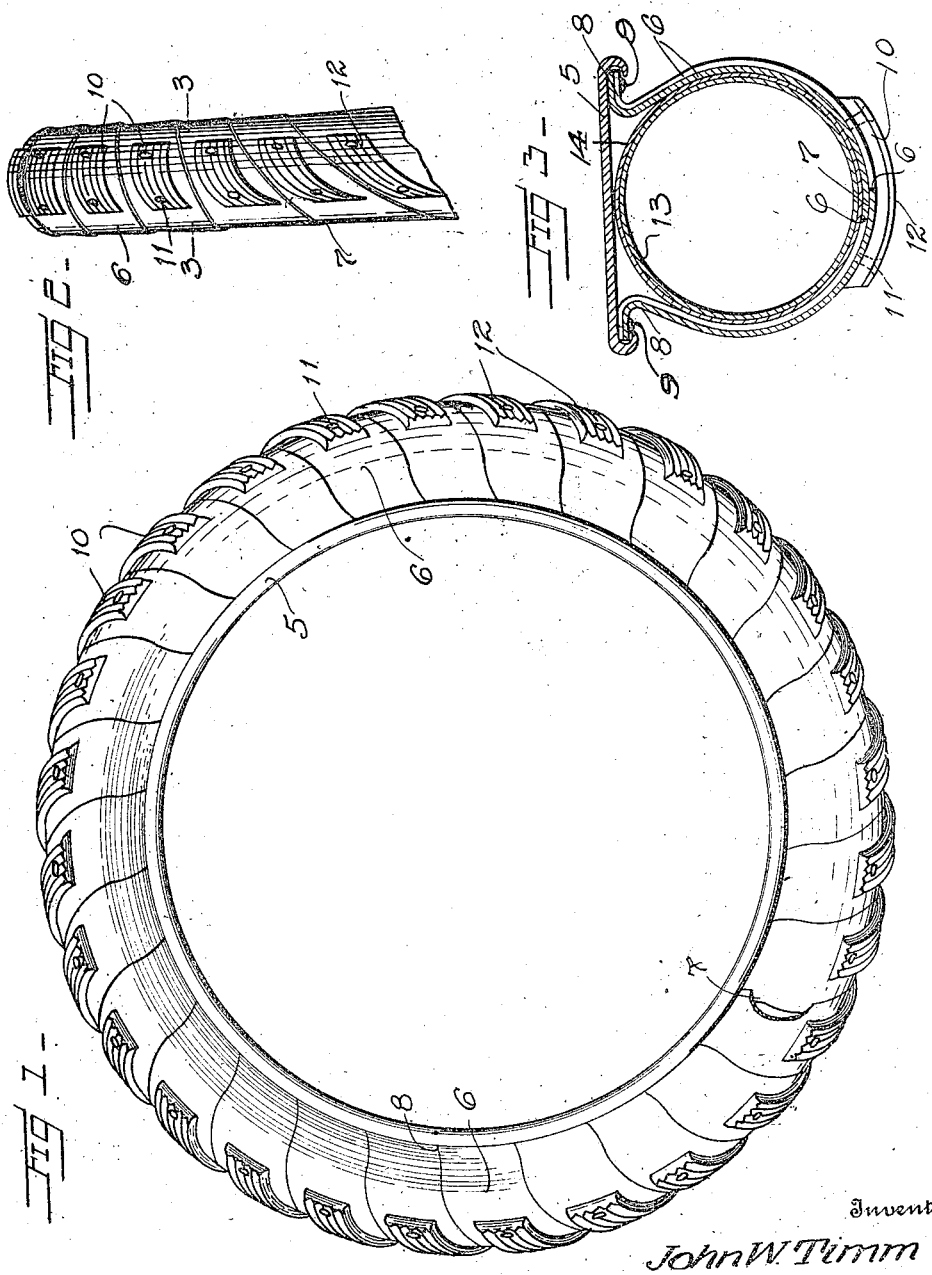

JOHN W. TIMM, OF MEMPHIS, TENNESSEE.

WHEEL-TIRE.

1,288,758.

Specification of Letters Patent.

Patented Dec. 24, 1918.

Application filed July 13, 1918. Serial No. 244,747.

*To all whom it may concern:*

Be it known that I, JOHN W. TIMM, a citizen of the United States, residing at Memphis, in the county of Shelby and State of Tennessee, have invented certain new and useful Improvements in Wheel-Tires, of which the following is a specification, reference being had to the accompanying drawings.

This invention relates to an improved wheel tire, and has for its primary object to provide a tire for motor vehicle wheels which will not be liable to puncture and at the same time will be lighter in weight and more durable and serviceable than motor vehicle tires now in general use which are constructed of rubber and canvas.

It is also another object of the invention to provide a tire structure made up entirely of resilient metal plates which are so arranged relative to each other that they mutually assist to yieldingly sustain the load, such arrangement affording a maximum of resiliency, as well as strength in the tire structure.

And it is another object of my invention to provide the individual plates constituting the tire with tread blocks which will effectually prevent the skidding or slipping movement of the vehicle wheel and assure the requisite tractive purchase upon the road surface for the propulsion of the vehicle.

With the above and other objects in view, the invention consists in the improved combination, construction and relative arrangement of the several parts as will be hereinafter more fully described, subsequently claimed and illustrated in the accompanying drawing in which similar reference characters designate corresponding parts throughout the several views, and wherein:—

Figure 1 is a side elevation illustrating the preferred embodiment of my improved wheel tire;

Fig. 2 is an edge view thereof; and

Fig. 3 is a section taken on the line 3—3 of Fig. 2.

In the illustrated embodiment of my invention, 5 designates a demountable tire rim of the clencher type and upon which the tire structure, to be presently described in detail is adapted to be mounted or secured.

In lieu of the ordinary casing made up of fabric and rubber as is employed in the conventional types of pneumatic tires, I provide a multiplicity of resilient steel plates 6.

These steel plates are arranged at an angle of 45° with respect to the circumferential line of the tire and have their side edges overlapped, as shown at 7. The ends of the adjacent plates which are outwardly curved, as at 8, are securely riveted to each other, as shown at 9. These out-turned ends of the tire plates are adapted to be seated upon the outer face of the rim 5 within the inwardly turned clencher flanges on the edges thereof, as clearly shown in Fig. 3. To the outer face of each plate 6 and upon the medial portion thereof, a tread block or shoe 10 is securely fixed by means of the rivets 11. These tread blocks are longitudinally curved to conform to the curvature of the tire plates and likewise extend at an angle of 45° with respect to the circumference of the tire. The outer convex faces of the tread blocks are ribbed or corrugated as seen at 12, so that they will securely grip the road surface which may be covered with ice or mud and effectually prevent the skidding movement of the vehicle wheels. These tread blocks or shoes, therefore, afford the necessary tractive engagement of the tire with the ground to assure the full utilization of the propulsive effort of the engine in driving the vehicle.

Within the laminated structure of the metal tire, an inflatable rubber tube 13 may be disposed. It is, however, to be understood that this tube is not provided for the purpose of securing resiliency, but merely to close any crevices which may occur between the lapped edges of the metal plates. The rubber tube is preferably inclosed within a canvas sheath or covering 14.

In practice, I have found that metal tire plates arranged as above disclosed and having a thickness of 1/32" are sufficiently resistant to radially applied pressures to sustain a motor vehicle having a weight of 1600 lbs. Of course, when the tire is to be applied to the wheels of heavier vehicles, the tire plates are proportionately increased in thickness. These plates are made of high grade steel and in themselves afford the necessary resiliency to cushion or absorb all ordinary road shocks or jars. It will be understood that in applying the tire to the wheel rim, the opposite side portions of the resilient metal plates may be swung or forced inwardly toward each other so that they may be engaged under the flanges of the wheel rim, and which operation may be facilitated by having the riveted ends of adjacent plates 6 capable of slight relative movement. If preferred, however, the rim 5 may be of a sectional type. The tread plates at the lower load bearing portion of the tire mutually coact and assist to take up such shocks and jars and also to sustain the weight of the load.

From the foregoing description, taken in connection with the accompanying drawing, the construction, manner of operation and several advantages of the invention will be clearly and fully understood. My improved metallic tire is, of course, absolutely puncture proof and in effect constitutes a circumferentially continuous articulated structure which will resiliently yield to both longitudinally and radially applied forces or pressures. At the same time, it will be seen that the improved tire is relatively simple and, therefore, can be produced at comparatively small manufacturing cost. The tire may also be very easily and quickly applied to the rim or removed therefrom, and will obviously withstand road wear for a much greater length of time than the usual canvas and rubber tires. The device is, therefore, well adapted for use upon trucks to be used for cross country transportation purposes.

While I have herein shown and described what I believe to be the preferred embodiment of the tire, it is to be understood that in practice it may be found desirable to resort to numerous minor modifications in the construction thereof, and accordingly I reserve the privilege of adopting all such legitimate changes as may be fairly embodied within the spirit and scope of the invention as claimed.

I claim:—

1. A resilient wheel tire consisting of a multiplicity of resilient metal plates arranged at an oblique angle with respect to the circumferential line of the tire and having their adjacent free side edges overlapping, and means connecting the ends of the plates to each other at their overlapping edges.

2. A metallic wheel tire comprising a multiplicity of resilient metal plates arranged at an angle of 45° with respect to the circumferential line of the tire and having their adjacent side edges overlapping, the end portions of said plates being outwardly turned and permanently secured to each other at their overlapping edges, the remaining edge portions of said plates being free and unconnected and a tread engaging shoe fixed to the outer face of each tire plate and extending in parallel relation to the overlapping edges thereof.

In testimony whereof I hereunto affix my signature in the presence of two witnesses.

JOHN W. TIMM.

Witnesses:
 MILTON THUNTILIS,
 HOMER W. POWELL.